United States Patent
Chen et al.

(10) Patent No.: US 8,436,787 B2
(45) Date of Patent: May 7, 2013

(54) AUTOSTEREOSCOPIC 3D DISPLAY DEVICE AND FABRICATION METHOD THEREOF

(75) Inventors: Byung-Soon Chen, Daegu (KR); Hyeok-Soo Kim, Gyeongsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 838 days.

(21) Appl. No.: 11/167,219

(22) Filed: Jun. 28, 2005

(65) Prior Publication Data

US 2006/0087499 A1    Apr. 27, 2006

(30) Foreign Application Priority Data

Oct. 23, 2004    (KR) .................. 10-2004-0085129

(51) Int. Cl.
*G09G 5/00* (2006.01)

(52) U.S. Cl.
USPC ............................. 345/6; 345/32; 345/105

(58) Field of Classification Search ............. 345/32, 345/43, 105, 4–8; 359/462
See application file for complete search history.

(56) References Cited

U.S. PATENT DOCUMENTS

| 3,829,196 | A  | * | 8/1974 | Deb ............................. 345/105 |
| 4,280,754 | A  | * | 7/1981 | Yano et al. ................. 359/267 |
| 5,315,377 | A  | * | 5/1994 | Isono et al. ................ 348/51 |
| 5,812,186 | A  | * | 9/1998 | Telfer et al. ................ 345/32 |
| 6,137,456 | A  |   | 10/2000 | Bhagavatula et al. .......... 345/7 |
| 2003/0227664 | A1 | * | 12/2003 | Agrawal et al. ............. 359/269 |
| 2006/0164578 | A1 | * | 7/2006 | Matsumoto et al. ......... 349/117 |

FOREIGN PATENT DOCUMENTS

| DE | 199 50 366 A1 | 5/2000 |
| GB | 2 088 577 A | 6/1982 |
| GB | 2 343 012 A | 10/1999 |
| JP | 8-76058 | 3/1996 |
| WO | WO 2004/968231 A1 | 8/2004 |

* cited by examiner

*Primary Examiner* — Allison Walthall
(74) *Attorney, Agent, or Firm* — Morgan, Lewis & Bockius LLP (57) ABSTRACT

An autostereoscopic 3D display device is provided. The display device includes a display panel for displaying an image, and a switching panel attached to the display panel for selectively implementing a 3D image mode and a 2D image mode according to whether an electric signal is supplied. The switching panel is divided into a transmission region and a non-transmission region using electrochromic materials.

9 Claims, 8 Drawing Sheets

AUTOSTEREOSCOPIC 3D DISPLAY DEVICE AND FABRICATION METHOD THEREOF

This application claims the benefit of Korean Patent Application No. 2004-0085129 filed in Korea on Oct. 23, 2004, which is hereby incorporated by reference.

BACKGROUND OF THE INVENTION

1. Field of the Invention

The present invention relates to a display device, and more particularly, to a thin and light autostereoscopic 3D display device that selectively switches between a 3D image mode and a 2D image mode.

2. Description of the Related Art

People perceive a three-dimensional effect because of physiological and psychological factors. In general, autostereoscopic 3D display techniques using binocular parallax, the largest factor in producing autostereoscopic viewing of an object at a short distance, permits people to achieve autostereoscopic viewing of an object. Techniques for displaying a 3D image are generally divided into those in which viewers wear a pair of eye-glasses and those in which viewers do not wear a pair of eye-glasses.

The techniques using eye-glasses can be classified into an anaglyph method in which the viewer wears a blue eye-glass and a red eye-glass for each of the viewer's eyes, a polarization method in which the viewer wears a pair of eye-glasses having lenses of different polarizations, and a time-sharing method in which periodically repeated time-shared polarization is synchronized with viewer eye-glasses having polarization shutters. However, wearing eye-glasses is inconvenient and makes it difficult for the viewer to observe other objects in addition to the 3D image.

Accordingly, research regarding the techniques in which the viewer does not wear eye-glasses has been actively conducted. The technique in which the viewer does not wear eye-glasses can be classified into a lenticular method in which a lenticular lens sheet using cylindrical lenses are perpendicularly arranged in front of a display panel and a parallax barrier method. With the development of a liquid crystal display device technique, a mechanical shutter can be substituted by a liquid crystal shutter, and accordingly, a 3D image and a 2D image can be selectively changed and used.

Figure 1:
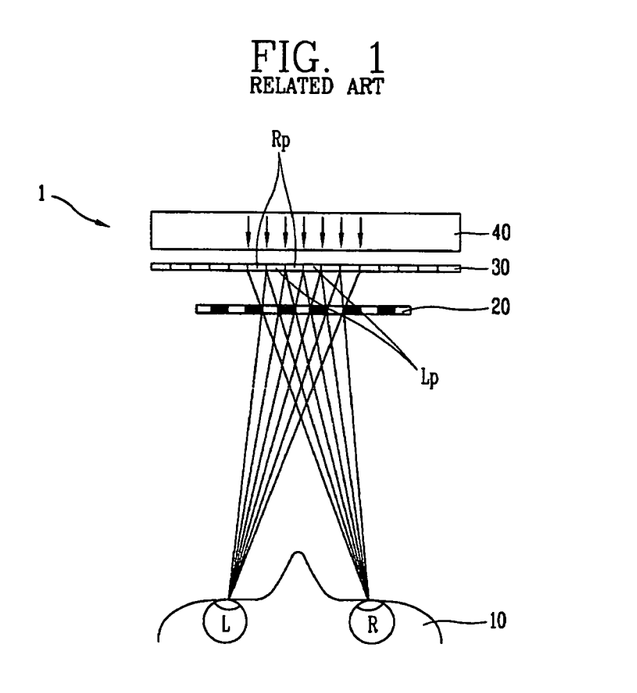
FIG. 1 is a schematic view illustrating the construction of an autostereoscopic 3D display device of a related art.

FIG. 1 is a view schematically illustrating an autostereoscopic 3D display device by a parallax barrier method that selectively switches between a 3D image and a 2D image.

As illustrated in FIG. 1, an autostereoscopic 3D display device 1 includes a backlight light source 40, a display panel 30, and a switching panel 20. The switching panel 20 includes an opaque slit unit, which becomes opaque with a predetermined width when an electric signal is supplied, and a transparent slit unit. The opaque slit unit and the transparent slit unit are alternately disposed.

An observer 10 views the display panel 30 through the transparent slit unit of the switching panel 20. The observer 10's left eye (L) sees a left eye region (Lp) of the display panel 30 through the transparent slit unit of the switching panel 20 and the observer 10's right eye sees a right eye region (Rp) of the display panel 30 through the transparent slit unit of the switching panel 20. In this manner, the observer 10's left eye (L) and right eye (R) see different regions of the display panel 30, respectively. The display panel 30 displays images corresponding to the observer 10's left eye and right eye in the left eye region (Lp) and the right eye region (Rp), respectively. Thus, the observer perceives a three-dimensional effect due to binocular parallax.

A structure of the switching panel 20 of the autostereoscopic 3D display device in accordance with the related art will now be described in detail with respect to FIG. 2.

Figure 2:
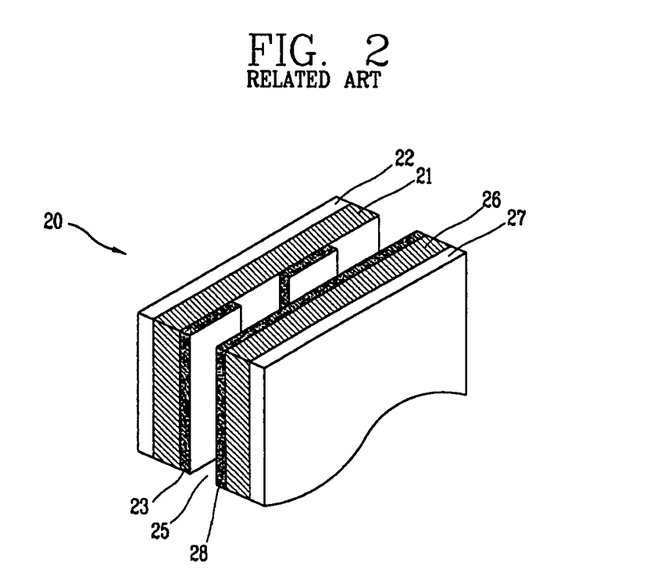
FIG. 2 is a view illustrating a switching panel in accordance with the related art.

As illustrated in FIG. 2, the switching panel 20 of the autostereoscopic 3D display device in the related art includes first and second transparent substrates 21 and 26 and a liquid crystal layer 25 formed between the first substrate 21 and the second substrate 26. Polarization plates 22 and 27 are attached to the outside of the first substrate 21 and the second substrate 26, respectively, a first electrode 23 formed of a transparent material such as ITO (indium tin oxide) is patterned and formed on the first substantial, and a second electrode 28 formed of the same material as the first electrode 23 is formed on an entire surface inside the second substrate 26. When electric signals are supplied to the first electrode 23 and the second electrode 28, liquid crystals between the first and second electrodes are driven to form the opaque slit unit.

Depending on whether or not the electric signals are supplied to the first electrode 23 and the second electrode 28, the display can be selectively switched between a 3D image mode and a 2D image mode. That is, when the signals are supplied to the first electrode 23 and the second electrode 28, a region where the first electrode 23 is formed makes the opaque slit unit, and therefore, the 3D image mode is implemented. When the signals are not supplied to the first electrode 23 and the second electrode 28, the 2D image mode is implemented.

However, when a liquid crystal display panel is used as the switching panel as described, the fabrication process becomes complicated since a process of fabricating the LCD panel and a process of mounting the fabricated LCD panel onto the polarization plate and the display panel are required. Thus, productivity is deteriorated. In addition, as the autostereoscopic 3D display increases in size due to the addition of the LCD panel, it is hard to obtain an autostereoscopic 3D display device that is thin and light weight. The addition of the LCD panel increases the unit cost of production and prevents mass production.

SUMMARY OF THE INVENTION

Accordingly, the present invention is directed to a autostereoscopic 3D display device and a fabrication method thereof that substantially obviates one or more of the problems due to limitations and disadvantages of the related art.

An object of the present invention is to provide an autostereoscopic 3D display device and a fabrication method thereof having a simple fabrication process Another object of the present invention is to provide an autostereoscopic 3D display device that is thin and light weight and a fabrication method thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an autostereoscopic 3D display device includes a display panel for displaying an image and a switching panel attached to the display panel for selectively implementing a 3D image mode and a 2D image mode according to whether an electric signal is supplied, the switching panel being divided into a transmission region and a non-transmission region using electrochromic materials.

In another aspect, a method for fabricating an autostereoscopic 3D display device includes providing a display panel for displaying an image, providing a switching panel attached to the display panel for selectively implementing a 3D image mode and a 2D image mode according to whether an electric signal is supplied, the switching panel being divided into a transmission region and a non-transmission region using electrochromic materials, and attaching the switching panel to the display panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 4A and 4B are views illustrating and exemplary embodiment in accordance with the present invention wherein

FIGS. 5A and 5B are views illustrating another exemplary embodiment in accordance with the present invention wherein

FIGS. 6A and 6B illustrate another exemplary embodiment in accordance with the present invention implementing a flexible switching panel wherein

FIGS. 7A and 7B illustrate another exemplary embodiment in accordance with the present invention wherein

FIGS. 8A and 8B illustrate another exemplary embodiment in accordance with the present invention wherein FIGS. 9A and 9B illustrate another exemplary embodiment in accordance with the present invention wherein

DETAILED DESCRIPTION OF THE PREFERRED EMBODIMENTS

Reference will now be made in detail to the preferred embodiments of the present invention, examples of which are illustrated in the accompanying drawings. Hereinafter, an autostereoscopic 3D display device and a fabrication method thereof will be described in more detail with reference to the accompanying drawings.

Figure 3:
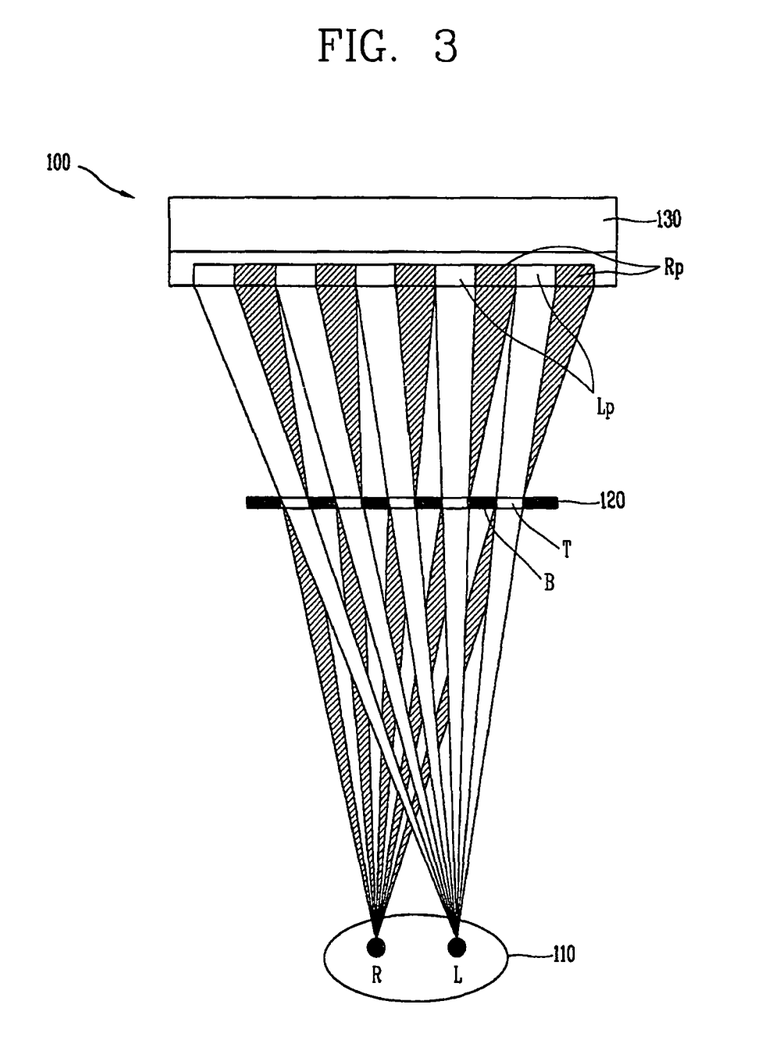
FIG. 3 is a schematic view illustrating a construction of an autostereoscopic 3D display device in accordance with the present invention.

FIG. 3 is a schematic view illustrating an autostereoscopic 3D display device in accordance with the present invention. As illustrated therein, in an autostereoscopic 3D display device 100, a switching panel 120—in which a transmission region (T) and a non-transmission region (B) are repetitively arranged—is disposed in front of a display panel 130. The switching panel 120 may also be formed at the rear of the display panel 130.

The display panel 130 may be one of an LCD (liquid crystal display) panel, a PDP (plasma display panel) panel, an FED (field emission display) panel, an EL (electric luminescence) panel, and a VFD (vacuum fluorescent display) panel. In addition, any other flat display panel can be applied. When a panel that does not emit light, e.g., the LCD (liquid crystal display) panel, is used as the display panel 130, a backlight for providing light to the display panel 130 should be separately provided.

The switching panel 120 is divided into the transmission region (T) and the non-transmission region (B) by electrochromic materials. In general, electrochromic materials are materials whose color and tint visibly change in response to oxidation and deoxidation reactions that change an absorption wavelength or an absorption ratio of the electrochromic materials. The electrochromic materials are divided into inorganic electrochromic materials and organic electrochromic materials. Exemplary inorganic electrochromic materials include $WO_3$, $NiO_xH_y$, $Nb_2O_5$, $V_2O_5$, $TiO_2$, $MoO_3$ and the like. Exemplary organic electrochromic materials include an electrochromic electrolytic solution, an electrochromic polymer and the like.

The electrochromic materials used in the present invention form the non-transmission region (B) when an electric signal is supplied. Here, the non-transmission region (B) means a region in which the observer cannot view an image appearing on the display panel 130. The transmission region (T) is transparent such that the image displayed on the display panel 130 can be viewed. That is, since the electrochromic materials are transparent when the electric signal is not supplied, an observer 110 views the image appearing on the display panel 130 through the switching panel 120. At this time, the observer 110 views a 2D image. However, when the electric signal is supplied to the electrochromic materials, the non-transmission region (B) is regularly formed by the electrochromic materials in the switching panel 120. Thus, the observer 110 views a 3D image.

More specifically, the observer 110 views an image displayed on the display panel 130 through the transmission region (T) of the switching panel 120. Though seeing the same transmission region (T), the left eye (L) and right eye (R) of the observer 110 see different regions of the display panel 130. That is, the left eye (L) sees left eye corresponding pixels ($L_p$) in the display panel 130 and the right eye (R) sees right eye corresponding pixels ($R_p$) of the display panel 130. Accordingly, images corresponding to the left eye and the right eye are displayed on the corresponding pixels of the display panel 130 through an image processor (not illustrated) such that the observer 110 perceives a three-dimensional effect.

The structure of the switching panel and the fabrication method thereof will now be described in more detail. The switching panel 120 is obtained by forming electrochromic materials on a transparent glass substrate or on a transparent flexible film. Since the switching panel 120 is thinner and lighter than the related art switching panel, i.e., a liquid crystal shutter, the autostereoscopic 3D display device can be thinner and lighter than the related art switching panel. In addition, the method for fabricating the switching panel in accordance with the present invention includes providing a transparent substrate and then forming non-transmission patterns by patterning electrochromic materials thereon. Accordingly, the fabrication process is very simple thereby improving productivity.

Figure 4A:
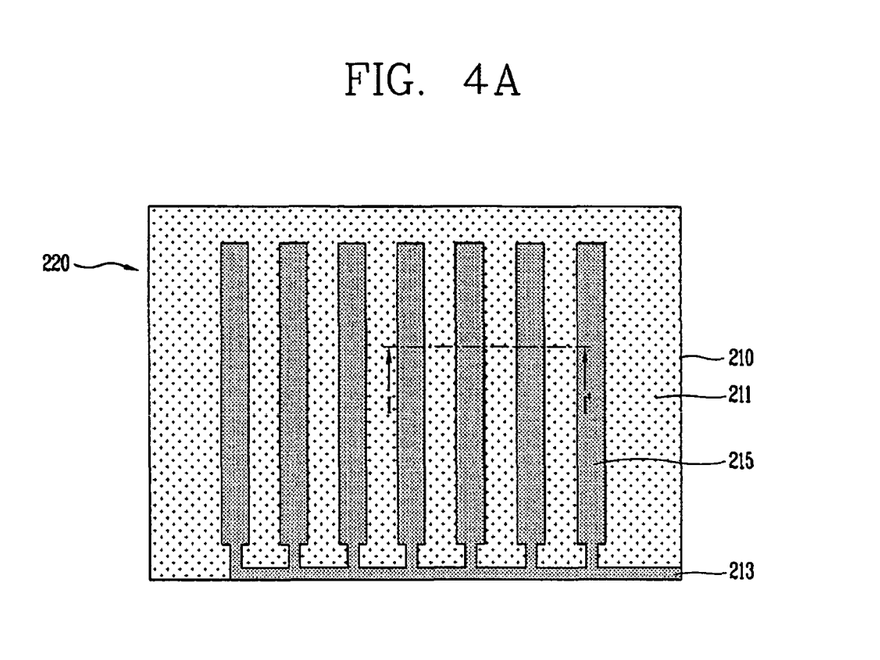
FIG. 4A is a plane view.
Figure 4B:
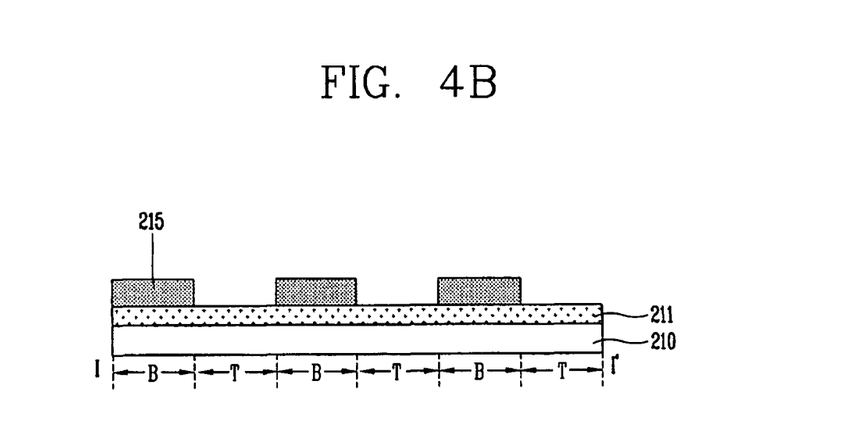
FIG. 4B is a cross-sectional view taken along line I-I' of FIG. 4A.

FIGS. 4A and 4B are schematic views illustrating a switching panel in accordance with an exemplary embodiment of the present invention. FIG. 4A is a plane view, and FIG. 4B is a cross-sectional view taken along line I-I' of FIG. 4A.

As illustrated in FIGS. 4A and 4B, a switching panel 220 includes a transparent glass substrate 210, a transparent electrode layer 211 formed on an entire surface of the glass substrate 210 and non-transmission patterns 215 repetitively formed on the transparent electrode layer 211 at regular intervals. The transparent electrode layer 211 may be formed by depositing a transparent conductive material such as ITO (indium tin oxide) or IZO (indium zinc oxide) on the glass substrate 210 by sputtering. The non-transmission patterns 215 may be formed by coating the transparent electrode layer 211 with the electrochromic materials and patterning the electrochromic materials by a photolithography method.

Then, the non-transmission patterns 215 form a non-transmission region (B) by being supplied with electric signals and the transparent electrode layer 211 exposed between the non-transmission patterns 215 forms a transmission region (T). To supply the electric signals to the non-transmission patterns 215, a non-transmission pattern connecting line 213 connecting all the non-transmission patterns 215 may be formed at an outer portion of the glass substrate 210. Meanwhile, by doping the non-transmission patterns 215 with conductive materials, the non-transmission patterns 215 may easily change color in accordance with the electric signals. That is, when the non-transmission patterns 215 are doped with the conductive materials, a desired color can be obtained with a relatively small electric current.

When the electric signals are supplied to the non-transmission patterns 215, the transmission region (T) and the non-transmission region (B) are alternately and regularly formed on the switching panel 220 because of characteristics of the electrochromic materials to implement the autostereoscopic 3D display device adopting the parallax barrier method. On the other hand, when the electric signals are not supplied to the non-transmission patterns 215, the non-transmission patterns 215 become or stay transparent in the transmission region and a 2D image is perceived.

Figure 5A:
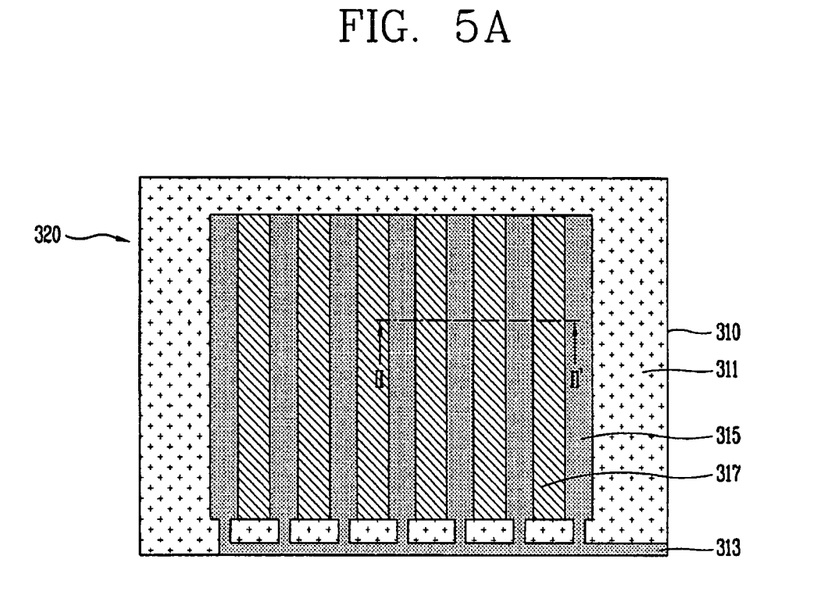
FIG. 5A is a plane view.
Figure 5B:
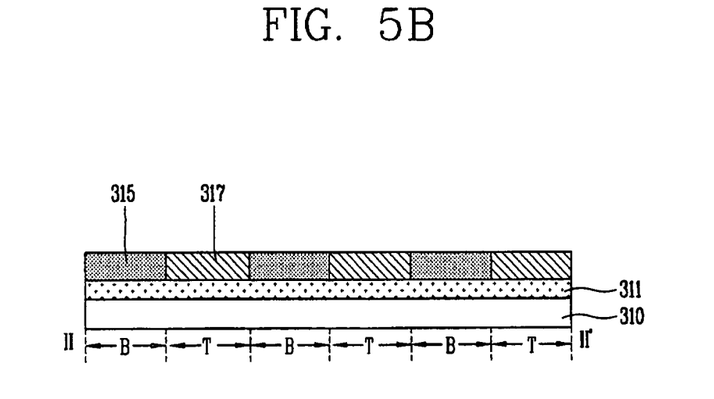
FIG. 5B is a cross-sectional view taken along line II-II' of FIG. 5A.

Transparent patterns may be additionally formed between the non-transmission patterns 215, i.e., on the transmission region (T). FIGS. 5A and 5B illustrate another exemplary embodiment of the present invention in which transparent patterns are additionally formed on the transparent region (T). FIG. 5A is a plane view, and FIG. 5B is a cross-sectional view taken along line II-II' of FIG. 5A. All components except for transparent patterns are similar to those of the previously described exemplary embodiment of FIGS. 4A and 4B. Thus, detailed descriptions for similar portions will be omitted.

As illustrated in FIGS. 5A and 5B, a switching panel 320 includes a transparent substrate 310, a transparent electrode layer 311 formed on an entire surface of the glass substrate 310, and non-transmission patterns 315 repetitively formed on the transparent electrode layer 311 at regular intervals. Transparent patterns 317 are formed between the non-transmission patterns 315. The transparent patterns 317 may be formed by applying a transparent organic material, such as photo acryl, on the substrate having the non-transmission patterns 315 thereon, and then patterning the transparent organic material. A non-transmission pattern connecting line 313 electrically connecting the non-transmission patterns 315 and supplying electric signals may be formed at an outer edge of the glass substrate. The non-transmission patterns 315 may be doped with conductive materials.

Figure 6A:
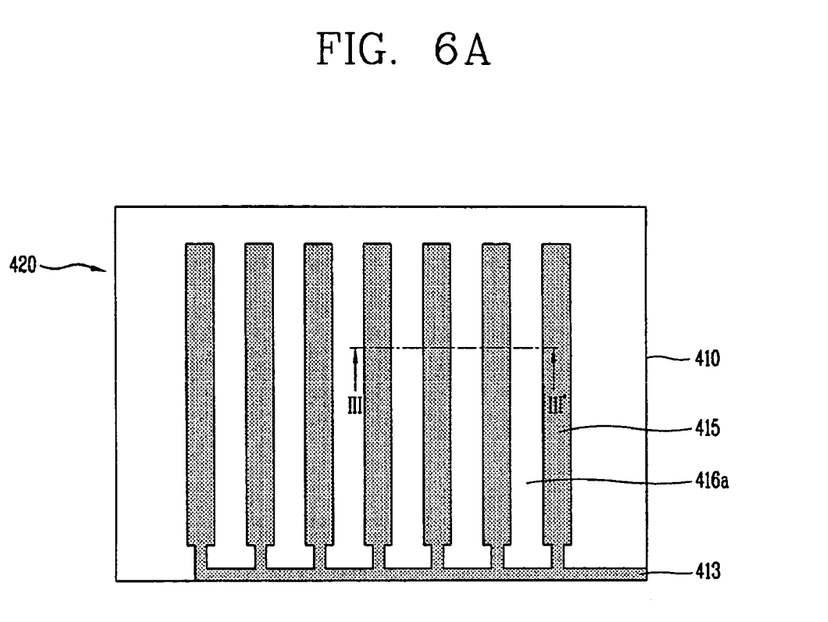
Figure 6B:
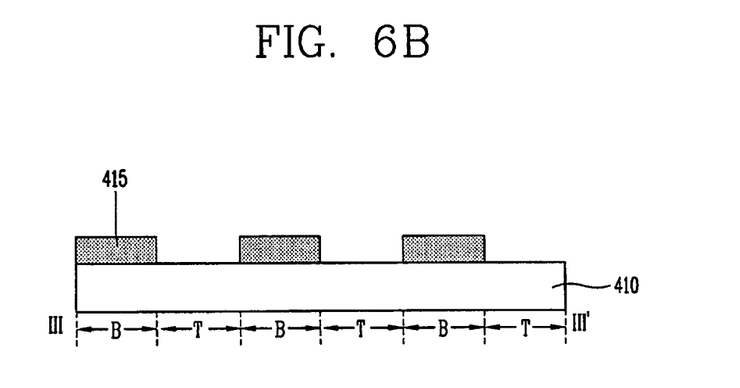
FIG. 6B is a cross-sectional view taken along line III-III' of FIG. 6A.

The switching panel may also be formed on a transparent flexible film. By forming the switching panel on the flexible film, the switching panel can be applied to a flexible display panel. FIGS. 6A and 6B illustrate another exemplary embodiment of the present invention implementing a flexible switching panel. FIG. 6B is a cross-sectional view taken along line III-III' of FIG. 6A.

As illustrated in FIGS. 6A and 6B, a switching panel 420 includes a transparent flexible film 410 and non-transmission patterns 415 repetitively formed on the film 410 at regular intervals. The non-transmission patterns 415 may be formed by coating the film 410 with electrochromic materials and then patterning the electrochromic materials through photolithography.

The non-transmission patterns 415 form a non-transmission region (B) by being supplied with electric signals. Transparent film 416a exposed between the non-transmission patterns 415 forms a transmission region (T). To supply the electric signals to the non-transmission patterns 415, a non-transmission pattern connecting line 413 connecting all the non-transmission patterns 415 may be formed at an outer edge of the film 410. Meanwhile, doped with conductive materials, the non-transmission patterns 415 may easily change color in accordance with the electrical signals.

The switching panel 420 can be accepted to a flexible display panel because it is formed on the flexible film 410. Since the film is thinner than a glass substrate, it is advantageous when constructing an autostereoscopic 3D display device that needs to be thin and light weight.

Figure 7A:
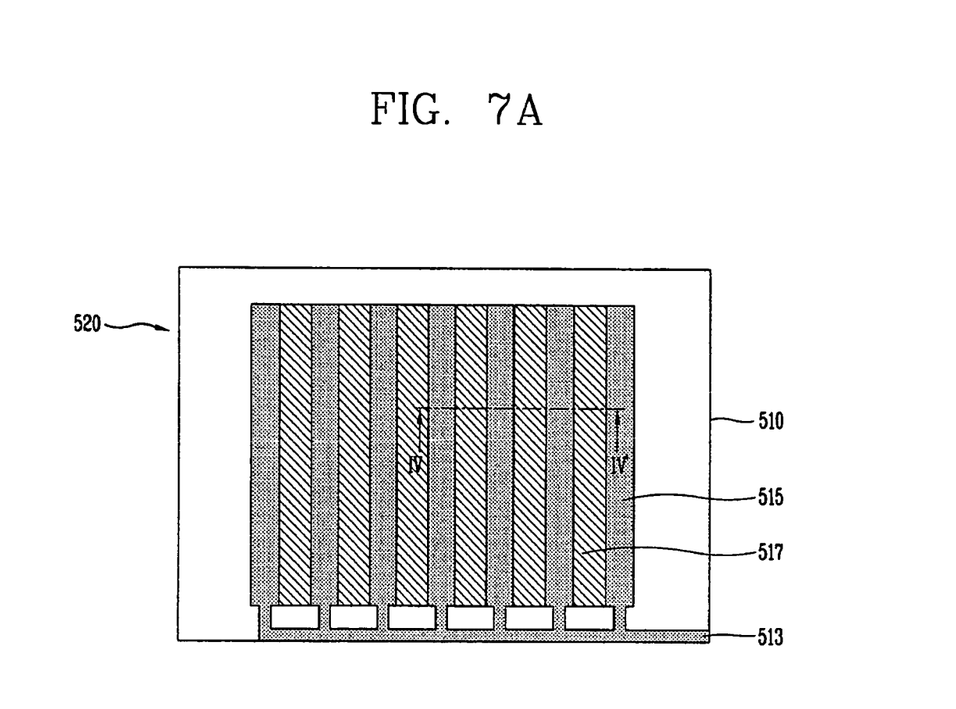
FIG. 7A is a plane view.
Figure 7B:
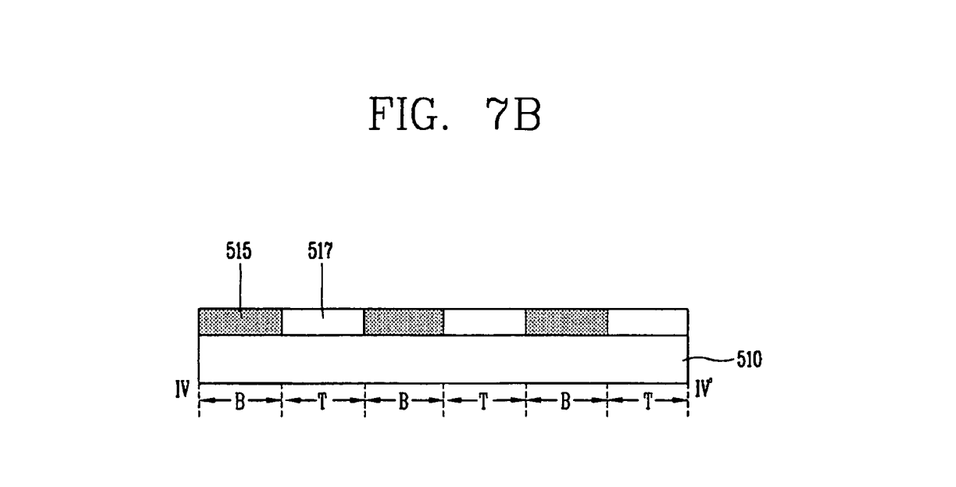
FIG. 7B is a cross-sectional view taken along line IV-IV' of FIG. 7A.

Transparent patterns may be additionally formed between the non-transmission patterns 415, i.e., on the transmission region (T). FIGS. 7A and 7B illustrate another exemplary embodiment of the present invention in which transparent patterns are formed on a transmission region. FIG. 7A is a plane view and FIG. 7B is a cross-sectional view taken along line IV-IV' of FIG. 7A.

As illustrated in FIGS. 7A and 7B, a switching panel 520 includes a transparent flexible film 510 and non-transmission patterns 515 repetitively formed on the film 510 at regular intervals. Transparent patterns 517 are formed between the non-transmission patterns 515. The transparent patterns 517 may be formed by applying a transparent organic material, such as photo acryl, on the substrate having the non-transmission patterns 515 thereon, and then patterning the transparent organic material. A non-transmission pattern connecting line 513 electrically connecting the non-transmission patterns 515 and supplying electric signals may be formed at an outer edge of the flexible film 510. The non-transmission patterns 515 may be doped with conductive materials.

Figure 8A:
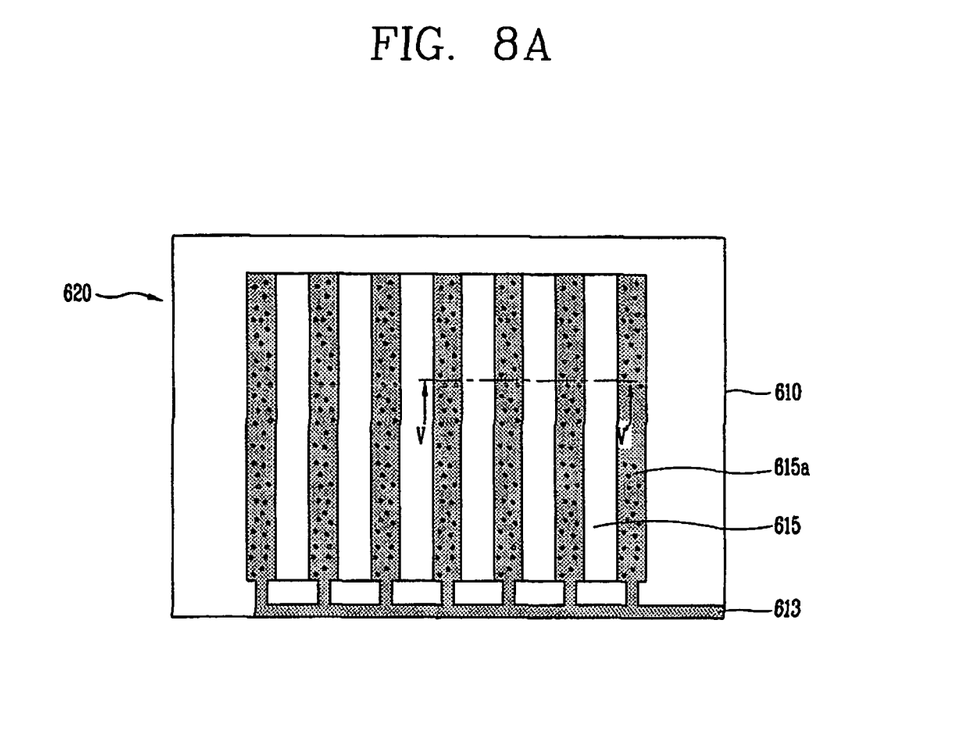
FIG. 8A is a plane view.
Figure 8B:
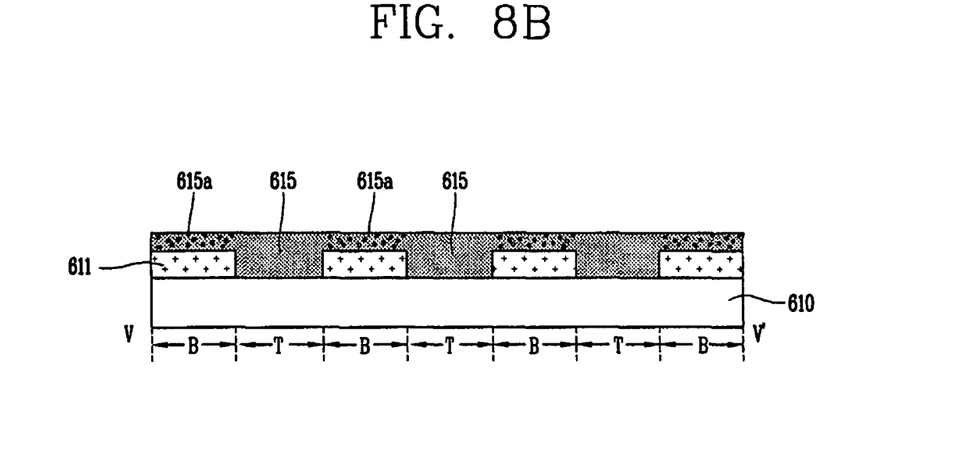
FIG. 8B is a cross-sectional view taken along line V-V' of FIG. 8A.

In addition, the switching panel may be formed by forming transparent electrode patterns on the non-transmission region using a glass substrate, applying electrochromic materials over an entire surface of the substrate including the transparent electrode patterns, and then doping a region corresponding to the conductive electrode patterns with conductive materials. FIGS. 8A and 8B illustrate another exemplary embodiment of the present invention. FIG. 8A is a plane view, and FIG. 8B is a cross-sectional view taken along line V-V' of FIG. 8A.

As illustrated in FIGS. 8A and 8B, a switching panel 620 includes a transparent glass substrate 610, transparent electrode patterns 611 repetitively formed on the glass substrate 610 at regular intervals, non-transmission patterns 615a forming a non-transmission region (B) on the transparent electrode patterns 611 and transmission patterns 615 forming a transmission region (T).

The transparent electrode patterns 611 may be formed by depositing a transparent conductive material, such as ITO (indium tin oxide) or IZO (indium zinc oxide), through a sputtering method. The non-transmission patterns 615a may be formed by coating an entire surface of the glass substrate 610 including the transparent electrode patterns 611 with electrochromic materials and then doping a region corresponding to the transparent electrode patterns 611 with conductive materials.

The non-transmission patterns 615a are supplied with electric signals using the transparent electrode patterns 611 formed thereunder. A transparent electrode pattern connecting line 613 electrically connecting the transparent electrode patterns 611 and supplying electric signals may be formed at an outer edge of the glass substrate.

In the switching panel 620, both the non-transmission patterns 615a forming the non-transmission region and the transmission patterns 615 forming the transmission region are formed of the electrochromic materials, but the non-transmission patterns 615a are doped with the conductive materials. Thus, the non-transmission patterns 615a easily change color in response to the electric signals as compared to the transmission patterns 615. That is, an electric current value required to change the color of the non-transmission patterns 615a is smaller than an electric value required to change the color the transmission patterns 615. Accordingly, though formed of the same electrochromic materials, the non-transmission patterns 615a and the transmission patterns 615 have different electric current values for generating color changes. Thus, the transmission region (T) and the non-transmission (B) can be formed at the same time. Therefore, in FIGS. 8A and 8B, the non-transmission patterns 615a must be doped with the conductive materials.

Figure 9A:
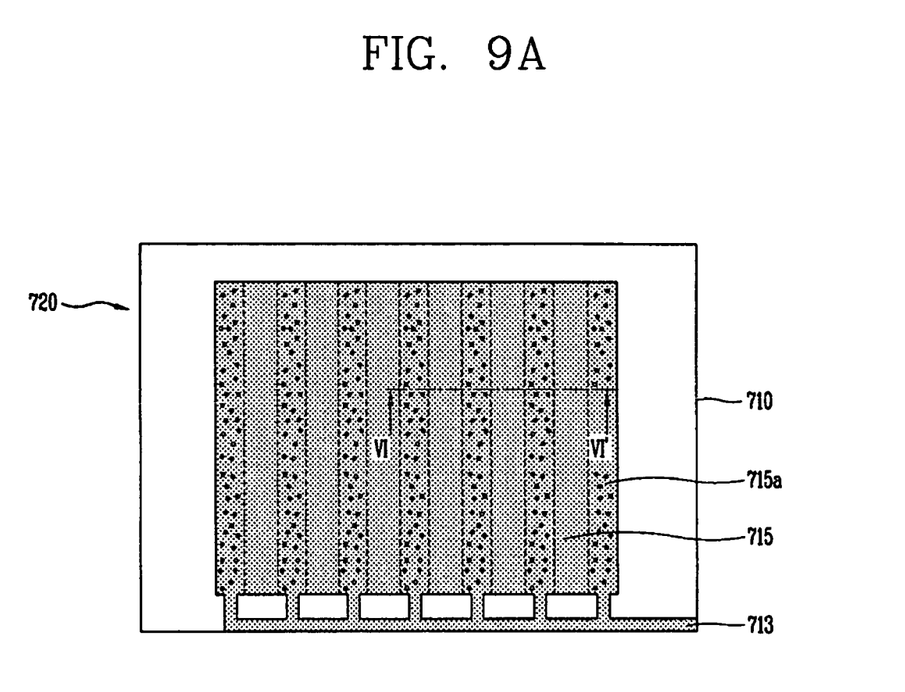
FIG. 9A is a plane view.
Figure 9B:
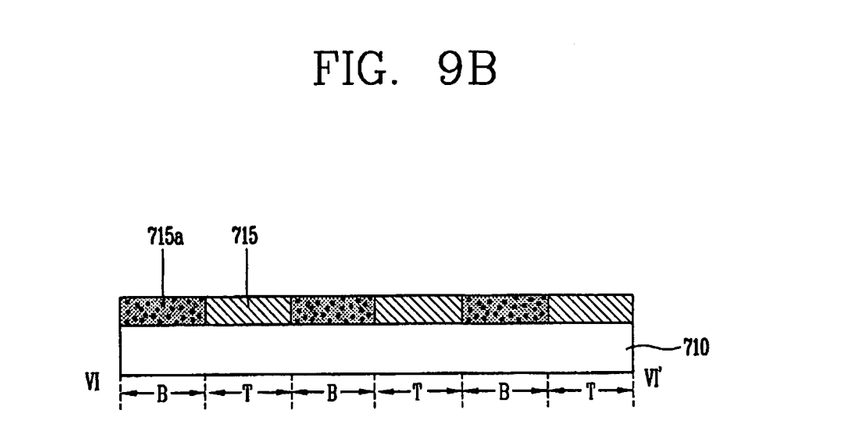
FIG. 9B is a cross-sectional view taken along line VI-VI' of FIG. 9A.

As described, the switching panel having the non-transmission patterns 615a and the transmission patterns 615 formed of the electrochromic materials may be applied to a transparent flexible film. FIGS. 9A and 9B illustrate another embodiment of the present invention in which the above-described switching panel is constructed at a transparent flexible film. FIG. 9A is a plane view and FIG. 9B is a cross-sectional view taken along line VI-VI' of FIG. 9A.

As illustrated in FIGS. 9A and 9B, a switching panel 720 includes a transparent flexible film 710 and an electrochromic material layer formed on an entire surface of the film 710. The electrochromic material layer includes non-transmission patterns 715a repetitively doped with conductive materials at regular intervals and transmission patterns 715 formed between the non-transmission patterns 715a (i.e., a region in which the doping of the conductive materials is not performed). The non-transmission patterns 715a and the transmission patterns 715 are formed of the same electrochromic materials but electric current values for generating color changes are different from each other. Therefore, a transmission region (T) and a non-transmission region (B) can be formed at the same time. Accordingly, the non-transmission patterns 715a must be doped with the conductive materials. In addition, a non-transmission pattern connecting line 713 electrically connecting the non-transmission patterns 715a and supplying electric signals to the non-transmission patterns 715a may be formed at an outer edge of the film 710.

As described, the present invention provides the autostereoscopic 3D display device using electrochromic materials, and enables the display device to selectively switch between a 3D image and a 2D image by allowing the electrochromic materials at regular intervals to form a non-transmission region. That is, a switching panel for switching between the 3D image and the 2D image is divided into a transmission region and a non-transmission region. The present invention implements a thin and light autostereoscopic 3D display device by forming the non-transmission region of the electrochromic materials. That is, since a liquid crystal display panel used as the switching panel in the related art includes first and second substrates and a liquid crystal layer formed between the two substrates, there is a limit as to how much the thickness and weight can be reduced while complicating the fabrication process. However, in the present invention, since the switching panel can be formed with the electrochromic materials repetitively disposed on a glass substrate or on a flexible film at regular intervals, the process is simple and a thin and light autostereoscopic 3D display device can be made. In addition, the present invention can be adapted to a flexible display panel by fabricating a switching panel using a flexible film.

It will be apparent to those skilled in the art that various modifications and variations can be made in the autostereoscopic 3D display device and fabrication method thereof of the present invention without departing from the spirit or scope of the invention. Thus, it is intended that the present invention cover the modifications and variations of this invention provided they come within the scope of the appended claims and their equivalents.

The invention claimed is:

1. An autostereoscopic 3D display device, comprising:
a display panel for displaying an image;
a backlight to provide light to the display panel; and
a switching panel attached to the display panel for selectively implementing a 3D image mode and a 2D image mode according to whether an electric signal is supplied, the switching panel being divided into a transmission region and a non-transmission region, the switching panel comprising:
a glass substrate;
a transparent electrode layer formed on an entire surface of the glass substrate;
electrochromic material pattern portions repetitively formed at regular intervals on the transparent electrode layer to define non-transmission regions and transmission regions, the non-transmission regions being respectively formed of portions of the transparent electrode layer with the electrochromic material pattern portions thereon, the transmission regions being respectively formed of portions of the transparent electrode layer without the electrochromic material pattern portions thereon, the electrochromic material pattern portions being doped with conductive materials such that the electrochromic material pattern portions having the conductive materials change color in accordance with the electric signal, and the non-transmission patterns obtain a desired color by an electric current; and
a single non-transmission pattern connecting line formed along an outer edge of the glass substrate in a first direction, to electrically connect only one common side of the electrochromic material pattern portions and to supply the electric signal to the electrochromic material pattern portions,
wherein each of the electrochromic material pattern portions extend in a second direction from the single non-transmission pattern connecting line;
wherein, when the electric signal is supplied to the electrochromic material pattern portions, the switching panel implements an autostereoscopic 3D display device, and wherein, when the electric signal is not supplied to the electrochromic material pattern portions, the electrochromic material pattern portions become transmitting to display a 2D image.

2. The device of claim 1, wherein the switching panel further includes transmission patterns formed between the electrochromic material pattern portions.

3. The device of claim 2, wherein the transmission patterns are formed of photo acryl.

4. The device of claim 1, wherein the display panel includes an LCD (liquid crystal display) panel.

5. The device of claim 1, wherein the display panel comprises one of a PDP (plasma display panel) panel, a FED (field emission display) panel, an EL (electric luminescence) panel, and a VFD (vacuum fluorescent display) panel.

6. A method for fabricating an autostereoscopic 3D display device, the method comprising:
   providing a display panel for displaying an image;
   providing a backlight to provide light to the display panel;
   providing a switching panel attached to the display panel for selectively implementing a 3D image mode and a 2D image mode according to whether an electric signal is supplied, the switching panel being divided into a transmission region and a non-transmission region, the providing the switching panel comprising:
   providing a transparent glass substrate;
   forming a transparent electrode layer on an entire surface of the glass substrate;
   and forming electrochromic material pattern portions repetitively disposed at regular intervals on the transparent electrode layer to define non-transmission regions and transmission regions, the non-transmission regions being respectively formed of portions of the transparent electrode layer with the electrochromic material pattern portions thereon, the transmission regions being respectively formed of portions of the transparent electrode layer without the electrochromic material pattern portions thereon, the electrochromic material pattern portions being doped with conductive materials such that the electrochromic material pattern portions having the conductive materials change color in accordance with the electric signal, and the non-transmission patterns obtain a desired color by an electric current; and
   forming a single non-transmission pattern connecting line along an outer edge of the glass substrate in a first direction, to electrically connect only one common side of the electrochromic material pattern portions and to supply the electric signal to the electrochromic material pattern portions,
   each of the electrochromic material pattern portions extending in a second direction from the single non-transmission pattern connecting line;
   wherein the electrochromic material pattern portions are formed by coating the transparent electrode layer with electrochromic materials and patterning the electrochromic materials by a photolithography method,
   when the electric signal is supplied to the electrochromic material pattern portions, the switching panel implements an autostereoscopic 3D display device, and when the electric signal is not supplied to electrochromic material pattern portions, the electrochromic material pattern portions become transmitting to display a 2D image; and
   attaching the switching panel to the display panel.

7. The method of claim 6, wherein the providing the switching panel further comprises:
   forming transmission patterns between the electrochromic material pattern portions by applying a transparent organic layer on the entire surface of the substrate including the electrochromic material pattern portions; and
   patterning the transparent organic layer to expose the electrochromic material pattern portions.

8. The method of claim 7, wherein the transmission patterns are formed of photo acryl.

9. An autostereoscopic 3D display device, comprising:
   a display panel for displaying an image;
   a switching panel attached to the display panel for selectively implementing a 3D image mode and a 2D image mode according to whether an electric signal is supplied, the switching panel being divided into a transmission region and a non-transmission region, wherein the switching panel comprising:
   a glass substrate;
   a transparent electrode layer formed on an entire surface of the glass substrate;
   electrochromic material pattern portions repetitively formed at regular intervals on the transparent electrode layer to define non-transmission regions and transmission regions, the non-transmission regions being respectively formed of portions of the transparent electrode layer with the electrochromic material pattern portions thereon, the transmission regions being respectively formed of portions of the transparent electrode layer without the electrochromic material pattern portions thereon, the electrochromic material pattern portions being doped with conductive materials such that the electrochromic material pattern portions having the conductive materials change color in accordance with the electric signal, and the non-transmission patterns obtain a desired color by an electric current; and
   a single non-transmission pattern connecting line formed along an outer edge of the glass substrate in a first direction to electrically connect only one common side of the electrochromic material pattern portions and to supply the electric signal to the electrochromic material pattern portions,
   each of the electrochromic material pattern portions extending in a second direction from the single non-transmission pattern connecting line; and
   a backlight to provide light to the display panel,
   wherein, when the electric signal is supplied to the electrochromic material pattern portions, the switching panel implements an autostereoscopic 3D display device, and
   wherein, when the electric signal is not supplied to the electrochromic material pattern portions, the electrochromic material pattern portions become transmitting to display a 2D image.

\* \* \* \* \*